United States Patent
Bamber et al.

(10) Patent No.: US 10,964,059 B2
(45) Date of Patent: Mar. 30, 2021

(54) STATIC CAMERA CALIBRATION USING MOTION OF VEHICLE PORTION

(71) Applicant: Continental Automotive GmbH, Hannover (DE)

(72) Inventors: David Bamber, Hove (GB); Lingjun Gao, Uckfield (GB); Robin Plowman, Southwick (GB)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/552,425

(22) Filed: Aug. 27, 2019

(65) Prior Publication Data

US 2020/0134869 A1 Apr. 30, 2020

(30) Foreign Application Priority Data

Oct. 25, 2018 (EP) .................................... 18202458

(51) Int. Cl.
*G06T 7/80* (2017.01)
*G06T 7/00* (2017.01)
*B60R 11/04* (2006.01)

(52) U.S. Cl.
CPC ................ *G06T 7/80* (2017.01); *B60R 11/04* (2013.01); *G06T 7/97* (2017.01); *G06T 2207/30264* (2013.01)

(58) Field of Classification Search
CPC .............. G06T 7/80; G06T 7/97; B60R 11/04
See application file for complete search history.

(56) References Cited

U.S. PATENT DOCUMENTS

| 6,437,823 B1 * | 8/2002 | Zhang | H04N 17/002 348/187 |
| 6,917,702 B2 * | 7/2005 | Beardsley | G06T 7/85 345/419 |

(Continued)

FOREIGN PATENT DOCUMENTS

| JP | 2011-087308 A | 4/2011 |
| JP | 2014-225819 A | 12/2014 |

OTHER PUBLICATIONS

L. Dron, "Dynamic camera self-calibration from controlled motion sequences," Proceedings of IEEE Conference on Computer Vision and Pattern Recognition, New York, NY, USA, 1993, pp. 501-506, doi: 10.1109/CVPR.1993.341083. (Year: 1993).*

(Continued)

*Primary Examiner* — Jamie J Atala
*Assistant Examiner* — Michael Robert Cammarata
(74) *Attorney, Agent, or Firm* — W. F. Fasse

(57) ABSTRACT

In a system and a method for extrinsic calibration of an image capture apparatus of a vehicle, the vehicle includes a vehicle body and a movable part configured to rotate around a known rotation axis relative to the vehicle body. The system includes an image capture apparatus having an image capture device mounted on the vehicle body and configured to capture at least two images of the movable part, an identification unit configured to identify at least two image features in the images, a calculation unit configured to calculate a calculated direction of the rotation axis relative to the image capture device based on the image features, and a calibration unit configured to determine extrinsic parameters of the image capture apparatus based on the calculated direction of the rotation axis relative to the image capture device and the known parameters of the rotation axis relative to the vehicle.

14 Claims, 6 Drawing Sheets

(56) References Cited

U.S. PATENT DOCUMENTS

| | | | | |
|---|---|---|---|---|
| 8,280,665 | B2* | 10/2012 | Nakamura | G06T 7/80 |
| | | | | 702/95 |
| 10,250,871 | B2* | 4/2019 | Ciurea | G06T 5/006 |
| 10,438,374 | B2* | 10/2019 | Dreuw | B60R 1/00 |
| 2006/0029271 | A1* | 2/2006 | Miyoshi | G06T 3/00 |
| | | | | 382/154 |
| 2008/0031514 | A1* | 2/2008 | Kakinami | G06T 7/80 |
| | | | | 382/154 |
| 2009/0033926 | A1* | 2/2009 | Haug | G06T 7/80 |
| | | | | 356/243.1 |
| 2010/0253784 | A1* | 10/2010 | Oleg | H04N 21/41422 |
| | | | | 348/187 |
| 2013/0222607 | A1 | 8/2013 | Oshima et al. | |
| 2014/0240690 | A1* | 8/2014 | Newman | G01S 17/87 |
| | | | | 356/4.01 |
| 2014/0347486 | A1* | 11/2014 | Okouneva | H04N 5/247 |
| | | | | 348/148 |
| 2015/0029338 | A1* | 1/2015 | Lee | G06K 9/00791 |
| | | | | 348/148 |
| 2015/0145965 | A1* | 5/2015 | Livyatan | H04N 13/239 |
| | | | | 348/47 |
| 2015/0356735 | A1* | 12/2015 | Shimizu | B60R 11/04 |
| | | | | 348/148 |
| 2016/0161602 | A1* | 6/2016 | Prokhorov | G01S 7/4026 |
| | | | | 702/97 |
| 2016/0328851 | A1* | 11/2016 | Garcia | G01B 11/002 |
| 2017/0024889 | A1* | 1/2017 | Brown | G06K 9/00785 |
| 2017/0221210 | A1* | 8/2017 | Martinello | H04N 13/282 |
| 2018/0053330 | A1* | 2/2018 | Lee | H04N 5/23238 |
| 2018/0232909 | A1* | 8/2018 | Gagnon | G06K 9/3258 |
| 2018/0292201 | A1* | 10/2018 | Sakano | H04N 5/225 |
| 2018/0300899 | A1* | 10/2018 | Dreuw | B60R 1/00 |
| 2019/0015988 | A1* | 1/2019 | Inazumi | B25J 9/1692 |
| 2019/0102911 | A1* | 4/2019 | Natroshvili | G06T 7/80 |
| 2019/0266737 | A1* | 8/2019 | Tang | G06K 9/6203 |
| 2020/0034987 | A1* | 1/2020 | Meng | G06T 7/80 |

OTHER PUBLICATIONS

C. Sweeney, J. Flynn and M. Turk, "Solving for Relative Pose with a Partially Known Rotation is a Quadratic Eigenvalue Problem," 2014 2nd International Conference on 3D Vision, Tokyo, 2014, pp. 483-490, doi: 10.1109/3DV.2014.66. (Year: 2014).*

Extended European Search Report and Examination Report for European Patent Application No. 18202458.8, dated Mar. 4, 2019, 14 pages, European Patent Office, Munich, Germany.

Robert P. Loce et al., "Computer Vision in Roadway Transportation Systems: a Survey", Journal of Electronic Imaging, vol. 22, No. 4, Dec. 1, 2013, XP055556131, pp. 1 to 25.

* cited by examiner

STATIC CAMERA CALIBRATION USING MOTION OF VEHICLE PORTION

TECHNICAL FIELD OF THE INVENTION

A steadily increasing number of vehicles are equipped with driver assistance systems which use information from the surrounding area of a vehicle detected by one or more image capture devices, e.g. video cameras. Video cameras are needed, for example for automatic traffic-sign recognition, lane tracking assistant, distance control etc.

BACKGROUND OF THE INVENTION

For driver assistance systems to be able to correctly process the information provided by the video cameras, the video cameras have to be calibrated after installation on the vehicle or after a replacement of the camera or the vehicle portion where the video camera is mounted.

It is to be understood that camera calibration describes the process of determining a number of parameters which describe the imaging of the camera. The process delivers numeric values for the geometric and optical parameters of the video camera and/or the extrinsic 3D position and orientation of the video camera relative to an extrinsic coordinate system.

Also, it is to be understood that the parameters of the video camera comprise extrinsic and intrinsic parameters. The extrinsic parameters determine the position and orientation of the video camera in the car or world coordinate system and the intrinsic parameters describe the relation between the video camera and the image coordinate system, e.g. the focal length, the optical center in the image plane and other optical characteristics.

Vehicle manufacturers are typically using an offline calibration method or an online calibration method (dynamic calibration) for the video camera calibration. Within these methods, the extrinsic calibration of the camera may be determined by using reference points in the surrounding area of the vehicle.

The offline calibration method usually conducted in factories requires targets at a defined position, distance and/or height. The targets may consist of known features, such as straight lines on the ground plane, or specific calibration boards, at known positions relative to the vehicle. During the calibration process, the orientation of the camera is determined by capturing images of these targets. The position of the targets in the images, together with the known position of the targets relative to the car, can be used to determine the camera's extrinsic parameters.

This method has the disadvantage that the orientation and position of the vehicle may change as the suspension, tire pressure and other factors of the vehicle are altered while the calibration process is performed. This will affect the determined extrinsic parameters of the cameras.

Further, the calibration method requires the vehicles to be always placed in the same position. Different settings in the vehicle can result in deviations in the position and lead to an imprecise calibration and/or calibration errors.

An imprecise calibration of a video camera in a driver assistance system can lead to imprecise position calculations of detected obstacles within the images.

A further used calibration method is the online (dynamic) calibration. This method is performed while the vehicle is in motion. While the vehicle is moving on a road, the video cameras capture images of the road and the surrounding area of the vehicle, especially of reference points, such as road signs or lane markings etc., to calculate the orientation of the camera relative to the world and/or vehicle, and thus the extrinsic parameters.

This method has the disadvantage that perfect measuring results are only achieved when the video cameras are able to detect clear features in the surrounding area. In general, to perform the online calibration, good conditions, such as little traffic on the road and clearly visible reference points, such as road signs or lane markings are necessary. The set-up of the orientation of the video cameras during the online calibration is based on detecting these features. On roads with heavy traffic, roads in fog or under setting sun, or missing reference points, such as missing road lanes or snow-covered roads, calibration can take a long time until it is finished or may have to be aborted completely in the worst case.

Preferably only well calibrated cameras with accurate extrinsic parameter are linked to each other to provide a perfect all-round visibility of the surrounding area of the vehicle.

SUMMARY OF THE INVENTION

Accordingly, it is an object of the present invention to provide a system and a method which provide an improved calibration result for an image capturing system.

The above object can be achieved by a system and a method according to the invention as set forth herein.

Disclosed is a system for extrinsic calibration of an image capture system of a vehicle, the vehicle comprises a body and a body portion, wherein the body portion is configured to rotate around a known rotation axis relative to the vehicle, the system comprising at least one image capture system comprising an image capture device adapted to capture at least two pictures of the body and/or of a surrounding area of the vehicle, wherein the image capture device is mounted on a vehicle portion or on the body. The system further comprises an identification unit adapted to identify at least two image features in the images. The system further comprises a calculation unit adapted to calculate a direction of the rotation axis relative to the image capture device on the basis of the features, and a calibration unit configured to determine extrinsic parameters of the image capture system on the basis of the calculated direction of the rotation axis relative to the image capture device and the known rotation axis relative to the vehicle.

The system has the advantage that it can be used in a vehicle in a static position. The calibration can be performed in a factory and/or garage and does not have to be performed during a ride or in motion. Advantageously using the inventive system reduces the setup time of the image capture devices mounted in the vehicle.

Further no precise placed reference points on a plane ground as well as no vehicle at a measured and precise position is necessary to perform the calibration according to the present invention.

Accordingly, to the present invention, it is sufficient to move a vehicle portion on which an image capture device is mounted (e.g. a mirror, door, boot i.e. trunk, or bonnet i.e. hood) such that, as a result, features in the surrounding area of the vehicle are moving in certain directions for the image capture devices. From these features it is possible to work out the orientation of the image capture device relative to the rotation axis of the vehicle portion with the mounted image capture device. Therefore, the setup time for the calibration of the image capture devices is reduced by the present invention.

Alternatively, the image capture device is mounted on the body, and adapted to capture at least two images of the body portion (e.g. a mirror, door, boot i.e. trunk, or bonnet i.e. hood). It is then sufficient to move the vehicle portion, which is in the images captured by the image capture device, such that, as a result, features on the body portion are moving in certain directions for the image capture device. From these features it is possible to work out the orientation of the image capture device relative to the rotation axis of the vehicle portion.

Further, during the calibration process no precise placement of the vehicle and information about the position are necessary. In addition, no known and clear reference points in the surrounding area of the vehicle and no precise information about the placement in the surrounding area are necessary to perform the calibration of the image capture devices by the present invention. Further, the system of the present invention measures the orientation of the image capture device relative to the vehicle structure and so does not require a continuous recalibration of the set-up if calibration settings are changing. Further to this, the calibration of the image capture devices according to the present invention is independent of tire pressure, suspension, slope or any reference points around the vehicle surrounding area.

In some advantageous embodiments the image capture device of the image capture system captures at least two images, wherein a first image comprises the body portion in a first position and a second image comprises the body portion in a second position.

In some advantageous embodiments the identification unit identifies at least two image features in the first image and at least two corresponding image features in the second image.

In some advantageous embodiments the vehicle portion comprises, or consists of, a boot i.e. trunk and/or a bonnet i.e. hood and/or a mirror and/or door of the vehicle.

The rotation between an image capture device mounted on the boot and/or bonnet and/or mirror of the vehicle and the vehicle frame can be calculated by opening and closing the door and the boot/bonnet or mirror of the vehicle, respectively. Advantageously the position of each single image capture device and their orientation relative to each other is known. If it is unknown, the 2-axis approach with a single image capture device can be used to calculate the rotation.

In some advantageous embodiments the system further comprises a memory unit adapted to store at least one vehicle characteristic. The memory unit is not limited to this. Moreover, further data relative to the calculation of the rotation can be stored.

In some advantageous embodiments the vehicle characteristic comprises a position of the at least one image capture device mounted on the vehicle and/or a rotation between a first image capture device and at least a second image capture device mounted on a vehicle portion and/or a position of a reference portion of the vehicle.

This has the advantage that the image capture devices are mounted on clear and known positions and also the rotation of the image capture devices relative to the axis of the vehicle portion where the image capture device is mounted can be calculated. This rotation can be easily used to determine the extrinsic parameters. No clear and known reference points in the surrounding area and no motion of the entire vehicle is necessary. Further reference portions of the vehicle and their motion computed from the pictures detected by the image capture device can be used as reference points to determine the rotation between the image capture device frame and the vehicle frame.

In some advantageous embodiments the calibration unit is further configured to determine the extrinsic parameters of the at least one image capture device on the basis of the rotation of at least two image capture devices relative to the rotation axis of the vehicle portion.

Thus, the system has the further advantage that the rotation can be determined by using two image capture devices mounted to observe two non-parallel rotation axes. For example, a first image capture device could be on the boot or bonnet and a second image capture device could be on the door. To get the rotation, a separate motion (open and close) of the boot or bonnet and door is necessary. This motion is necessary to calculate the rotation axis of the door and the rotation axis of the boot, or the rotation axis of the door and the rotation axis of the bonnet. Advantageously the full rotation can be calculated from the information of the two axes within the image capture device frame measured through the motion of the boot or bonnet and door of the vehicle.

In some advantageous embodiments the calibration unit is further configured to determine the extrinsic parameters of the at least one image capture device on the basis of the rotation of at least two adjacent image capture devices relative to the axis of the vehicle portion.

It is to be understood that adjacent describes the relation of the two image capture devices, which are used to calculate the rotation axis of the vehicle portion where they are mounted and to calculate the extrinsic parameters. The adjacent image capture devices are the image capture devices mounted in the left or right door/mirror of the vehicle and the image capture device of the boot or the image capture devices mounted in the left or right door/mirror of the vehicle and the image capture device of the bonnet.

In some advantageous embodiments the calculated rotation of the at least one image capture device relative to a rotation axis of the vehicle portion is caused by a motion of the boot and/or bonnet and/or mirror and/or motion of the image capture device mounted on the vehicle portion.

The calculated orientation of the image capture device may be a 3-axis or 2-axis rotation relative to the body of the car.

A 2-axis rotation solves the orientation of the camera in two degrees of freedom (DOF). For example, if the image capture device observes a door rotating around the z axis, the camera's orientation can be determined around the x and y axis.

A 3-axis rotation solves the orientation of the camera in all three rotational degrees of freedom (DOF). For example, if the image capture device observes a door rotating around the z axis, and a boot or bonnet rotating about the y axis, the camera's orientation can be determined around the x, y and z axes. Alternatively, any two non-parallel axes could be used.

In this way, advantageously, the present invention can be performed with two different calculations. The 3-axis rotation (between the vehicle body and the image capture device frame) can be attained by rotating the image capture device frame around a second axis that is not parallel to the first axis. The first axis corresponds to the door/boot/bonnet rotation axis and the second axis can be provided from the wing mirror movement or a mechanism to rotate the image capture device, for example, on the boot. The mechanism provides an extra rotation with extra information about the orientation relative to the vehicle. In this case only one image capture device and no relation between different image capture devices are necessary. Therefore, the opening and closing of the boot and rotation of the image capture device on its own position provides information about the third axis for a calculation of the full rotation.

A further three-axis rotation can be attained by having a door/boot/bonnet which opens on a changeable axis. Advantageously the door makes different motions while opening and thus providing information about rotation around different axis. Any body part that rotates around a rotation axis and whose rotation can be determined by the image capture device could be used for this purpose, such as a windscreen wiper, or an additional body part that is used solely for calibration.

The 2-axis rotation can be found by rotating the image capture device around the mirror/door/boot/bonnet rotation axis while opening. The 3-axis rotation to calculate the full rotation can then be found by observing a portion of the vehicle within the image when the door/boot/bonnet is in the closed or fully open position. This can be achieved by using image capture devices with a large angle that see portions of the vehicle.

Disclosed is also a vehicle comprising the system for extrinsic calibration of at least one image capture system as defined above, wherein the image capture system is mounted on a vehicle portion of the vehicle.

In the following, details of the vehicle on which the advantageous system defined above can be implemented will be provided.

In some advantageous embodiments the vehicle portion comprises the bonnet and/or boot and/or mirror and/or door of the vehicle.

Further a method is disclosed for extrinsic calibration of an image capture system mounted on a vehicle, the vehicle comprises a body and a body portion, wherein the body portion is configured to rotate around a rotation axis relative to the vehicle, the method comprising steps of capturing at least two images of the body and/or surrounding area of the vehicle by an image capture device of the image capture system, wherein the image capture device is mounted on a body portion or on the body of the vehicle. The method further comprising the step identifying at least two image features. The method further comprises the step of calculating a direction of the rotation axis relative to the image capture device on the basis of the image features. The method further comprises the step of determining extrinsic parameters of the image capture system on the basis of the calculated direction of the rotation axis relative to the image capture device and the rotation relative to the vehicle.

In the following, details of the method performed by the system will be provided according to the present invention.

In some advantageous embodiments, the method further comprises capturing at least two images of the body portion of the vehicle by an image capture device of the image capture system, wherein the image capture device is mounted on the body of the vehicle.

In some advantageous embodiments, the method further comprises capturing at least two images, wherein a first image comprises a body part or an image detail of the surroundings in a first position and a second image comprises a body part or an image detail of the surroundings in a second position.

In some advantageous embodiments, the method further comprises capturing at least two images, wherein a first image comprises the body portion in a first position and a second image comprises the body portion in a second position.

In some advantageous embodiments, the method further comprises identifying at least two image features in the first image and at least two corresponding image features in the second image. In some advantageous embodiments the position and or orientation of the features observed within the plurality of different pictures provides the motion of the features relative to the axis of the vehicle portion.

In some advantageous embodiments the method further comprises determining the extrinsic parameters of the image capture device on the basis of the rotation of at least two image capture devices relative to the axis of the vehicle portion.

In the following, the step of calculation of the rotation will be provided according to the present invention.

In some advantageous embodiments the calculated rotation of the image capture device relative to an axis of the vehicle portion comprises a motion of the boot and/or bonnet and/or mirror and/or motion of the image capture device on the vehicle portion.

In the following, the rotation of the image capture device is calculated by a motion of a vehicle portion.

In some advantageous embodiments the method is performed in a parking position of the vehicle.

Advantageously, the present invention can be performed in a static position and no motion and/or moving on the road is necessary. Further it can be performed on a position that is unknown in relation to specific reference points in the surrounding area of the vehicle.

Further disclosed is a computer-readable storage medium, which may be a tangible, non-transitory and non-transient computer-readable storage medium, and which comprises or stores thereon executable program instructions that perform the method as defined above when executed by a control unit of the vehicle.

DETAILED DESCRIPTION OF EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including", "comprising" or "having" and variations thereof herein is meant to encompass the items listed thereafter and equivalents thereof as well as additional items. The terms "connected", "mounted" and "coupled" are used broadly and encompass both direct and indirect connecting and coupling.

It is also to be noted that the image capture devices are mounted on a vehicle portion by an interface that provides a detachable connection between the image capture device and the vehicle portion.

Figure 1:
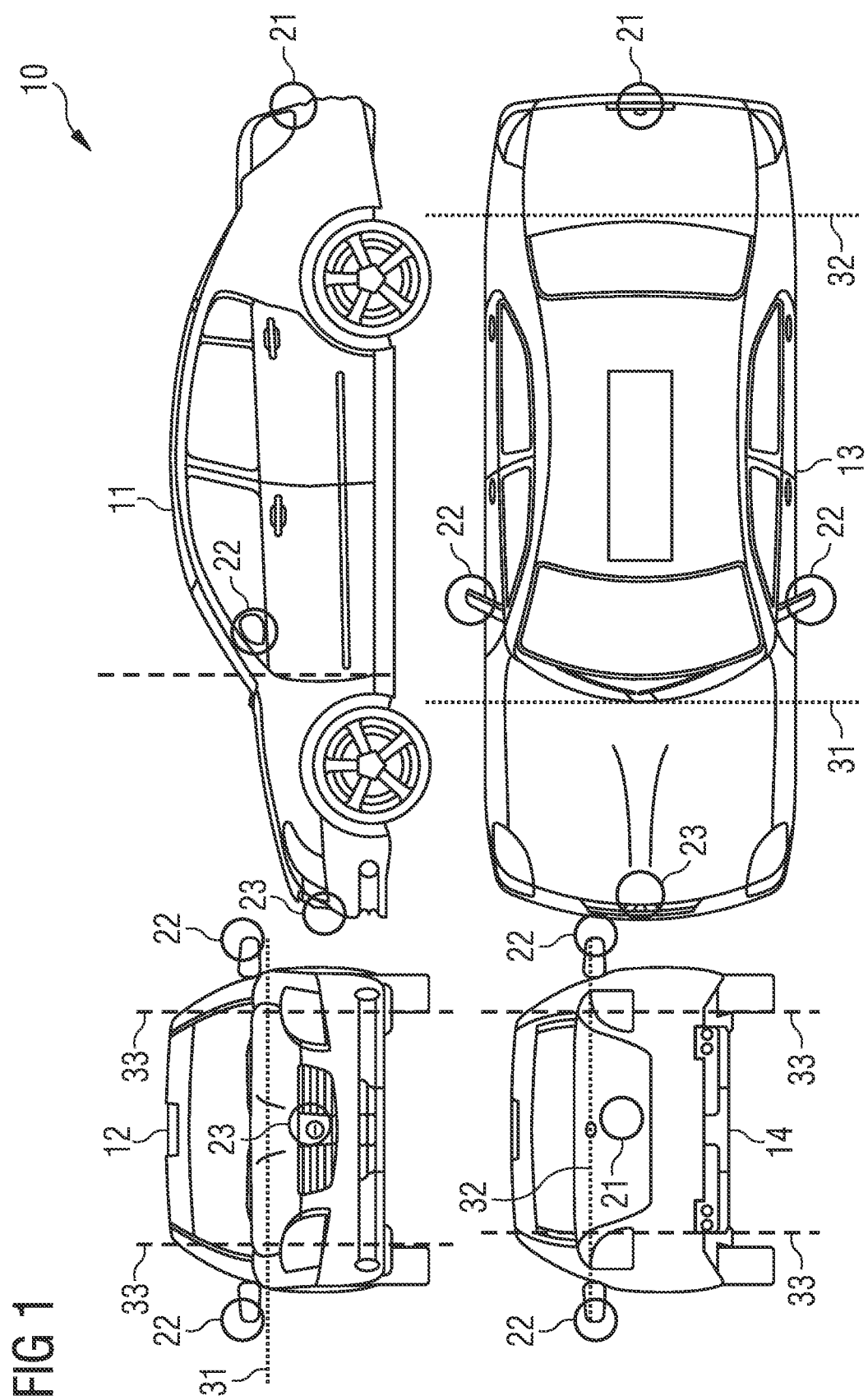
FIG. 1 shows a vehicle with mounted image capture devices in a top view, side view, front view, and rear view.

FIG. 1 shows a vehicle 10 in a side view 11, in a front view 12, in a top view 13, and a rear view 14. The vehicle 10 comprises different image capture systems 21, 22, 23 comprising an image capture device 22 mounted on the mirror frame, an image capture device 21 mounted on the boot frame, and an image capture device 23 mounted on the bonnet frame. FIG. 1 also shows the rotation axes of the doors, boot (i.e. trunk), and bonnet (i.e. hood). As the left or right door of the vehicle is opened and closed, the left or right door rotates about the respective door axis 33. As the boot of the vehicle is opened or closed, the boot rotates about the boot axis 32. As the bonnet is opened or closed, the bonnet rotates about the bonnet axis 31.

The orientation of the image capture device mounted on the mirror, boot, or bonnet, in the vehicle frame can be calculated by moving (opening and closing) the door, boot and bonnet about their respective axis 33, 32, 31. The apparent motion of image features (objects or features in the surrounding area of the vehicle, or body portion), detected in the images taken by the image capture device as the door or mirror, boot or bonnet is opened and closed allows the rotation axis of the vehicle's mirror, door, boot or bonnet to be measured. If two non-parallel rotation axes are measured, the three extrinsic parameters representing the camera's rotation about the x, y and z axes can be determined. For instance, if the rotation axes of the door and the boot are measured, the orientation of the image capture device relative to the vehicle 10 can be calculated.

If only one rotation axis is measured, the orientation of the image capture device can only be determined around two axes perpendicular to the rotation axis observed. For instance, if the rotation axis of the boot (i.e. the y axis) is measured, then the orientation of the image capture device can be determined only around the x and z axes, and not around the y axis (assuming the boot's rotation axis is parallel to the y axis).

In this case, the unknown orientation around the observed axis could be determined by observing a portion of the vehicle within the images.

For instance, a portion of the boot could be observed in the fully open and closed positions within the images to determine the orientation of the image capture device around the boot's rotation axis (y axis).

Alternatively, a portion of the boot could be observed in a known orientation between fully open and closed.

The calculation of the orientation of the image capture device should not be limited to the image capture devices 21, 22, 23 as described above and presented in FIG. 1, and their respective mounting in the mirror/door, boot, and bonnet. Rather, there are further image capture systems comprising an image capture device mounted in different body portions of the vehicle 10 providing information for driver assistance systems that can be used to identify image features in the images of the body and/or surrounding area and/or body portion to calculate the direction of the rotation axis relative to the image capture device.

Figure 2:
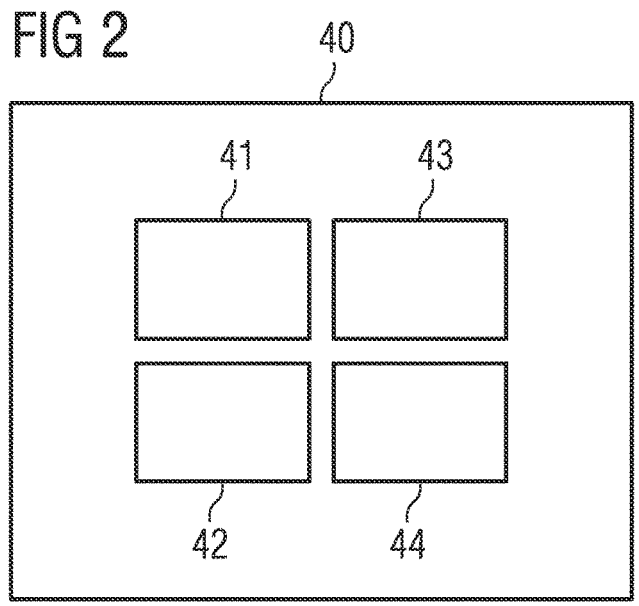
FIG. 2 shows a block diagram of a possible embodiment of a control unit of a vehicle.

FIG. 2 shows a block diagram of a possible embodiment of a control unit of a vehicle.

In the illustrated embodiment, the control unit 40 of a vehicle 10 comprises the memory unit 41, the identification unit 42, the calculation unit 43, and the calibration unit 44.

The control unit 40 is installed in the vehicle 10 and enables the calibration of the image capture systems 21, 22, 23 mounted on the mirror/door, boot, and bonnet in a parking position of the vehicle by only moving body portions of the vehicle 10 with an image capture and without moving of the whole vehicle.

The memory unit 41 is adapted to store information and/or calculation results of motions from features or objects between at least two images captured by image capture devices 21, 22, 23. Furthermore, the memory unit 41 is adapted to store the calculation result of the rotation axis.

The identification unit 42 is adapted to identify, on the images taken by the image capture device, at least two features or objects, such that the rotation axis of the vehicle portion can be determined. The identification unit may identify features on the vehicle body or in the surrounding area of the vehicle, if the image capture device is mounted on the vehicle portion, to compute the motion of the features or objects between the at least two images. Alternatively, the identification unit may identify features on the vehicle portion, if the image capture device is mounted on the vehicle body, to compute the motion of the features or objects between the at least two images.

It is to be understood that also a video provided by a video camera consists of a plurality of images, wherein the number of images depends on the frame rate. The motion of the feature or object from the plurality of images can be extrapolated and used to calculate the rotation axis of the vehicle portion.

The calculation unit 43 is adapted to calculate the direction of the rotation axis relative to the image capture device on the basis of the image features.

The calibration unit 44 is configured to determine the extrinsic (intermediate) parameters of the image capture system 21, 22, 23 on the basis of the calculated direction of the rotation axis relative to the image capture device 21, 22, 23 and the rotation relative to the vehicle 10.

Figure 3:
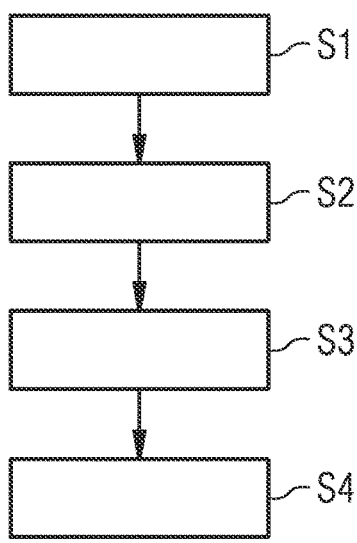
FIG. 3 shows a flowchart of a possible embodiment of a method for extrinsic calibration of an image capture system of a vehicle.

FIG. 3 shows a flowchart of a possible embodiment of a method for extrinsic calibration of an image capture system 21, 22, 23 of a vehicle 10.

In the illustrated embodiment, the method comprises four main steps.

In a first step S1 at least two images are captured by an image capture device of the image capture system 21, 22, 23 such that the rotation axis of the body portion can be calculated. If the image capture device is mounted on the body portion, the image capture device captures a first image and a second image of the body and/or surrounding area of the vehicle 10. If the image capture device is mounted on the body, the image capture device captures a first image and a second image of the body portion. The first image is captured with the body portion in a first position. The second image is captured with the body portion in a second position.

In a second step S2 at least two image features in the images are identified.

In a third step S3 a direction of the rotation axis relative to the image capture device on basis of the image features in the images is calculated. The direction of the rotation axis can be defined as a unit vector parallel to the rotation axis.

In a fourth step S4 the extrinsic parameters of the image capture system 21, 22, 23 are determined on the basis of the calculated direction of the rotation axis relative to the image capture device and the rotation relative to the vehicle 10.

In the first step S1 while opening/closing the door/boot/bonnet the image capture system 21, 22, 23 captures images of the body of the vehicle 10 and/or surrounding area of the vehicle 10 and/or body portion. Within the images taken by the image capture device of the image capture system 21, 22, 23 features or objects are identified and the position and/or motion of the identified features or objects is tracked. In the third step the direction of the rotation axis is determined relative to the image capture device on the basis of the image features.

Similarly, to the motion of the door/boot/bonnet, in a further embodiment, the motion of the wing mirror can be used to calculate the direction of the rotation axis of the wing mirror.

The wing mirror can rotate over an angle at the fixation point with the door of the vehicle 10 and after closing the door, the mirror can be folded and unfolded, the motion of the features detected within the images taken by the image capture device of the image capture system 22 during the folding motion can be used to calculate the direction of the rotation axis relative to the image capture device of the image capture system 22.

The observed rotation axis of a body part of a vehicle, in combination with the known location of this rotation axis relative to the vehicle, is used to determine some parameters of the image capture system's extrinsic calibration. The extrinsic calibration converts coordinates in the image capture system reference frame (e.g. the coordinate system where the z axis points down the optical axis) to the coordinates in the car reference frame (e.g. the coordinate system where the z axis points upwards). The extrinsic calibration consists of the image capture system's orientation and location. The orientation defines which direction the image capture system is pointing, i.e. its rotation as defined in the car reference frame. The location defines the image capture system's position with respect to a defined zero position on the car, such as the center of the rear axle.

To determine the extrinsic orientation of the image capture system the direction of the rotation axis can be calculated. The rotation axis of a body part (such as a door) needs to be known in advance for this method to work. For instance, the rotation axis of the door may be known to be parallel to the z-axis of the car (measured in the car reference frame). When the image capture system on the vehicle observes image features moving due to the rotation of the door, the system can calculate the direction of the rotation axis of the door in the camera reference frame. The system can then determine the rotation needed such that this observed rotation axis in the image capture system reference frame is parallel with the known axis in the car reference frame. This will convert the coordinates of the rotation-axis into the car reference frame. This will provide information regarding the image capture system extrinsic calibration.

The method can determine the image capture device orientation around two rotation axes (the x and y axis in this example) perpendicular to the rotation axis of the body part. It is possible to resolve the unknown orientation of the image capture system, around the rotation axis of the body part by using further information, such as by using a full 3D model of the car, or by observing a second (non-parallel) rotation axis of another body part of the vehicle 10.

For instance, the image capture device could capture image features moving due to the rotation of the door, and image features moving due to the rotation of the door mirror (if the door mirror rotates around a rotation axis that is not parallel to the rotation axis of the door) to determine the full orientation of the image capture device around the x, y and z axes of the car.

The direction of the rotation axis in the image capture reference frame provides information regarding the image capture system's orientation in the vehicle 10 reference frame, when compared with the known rotation axis.

The location of the rotation axis in the image capture reference frame provides information regarding the image capture system's location in the vehicle reference frame, when compared with the known rotation axis.

The rotation axis is calculated by tracking the motion of image features in the images. The minimum number of image features needed relates to the number of unknown parameters in the equations. To determine direction and position of the rotation axis five features are needed. A five-point Essential Matrix algorithm could then be used, such as the Nister's five-point relative pose algorithm, to recover the rotation and translation of the image capture system relative to the rotating body part. The rotation and translation of the image capture system could then be converted into the rotation axis direction and position.

Many other alternative relative pose algorithms would also be suitable to calculate the relative motion of the image capture system. It may be possible to use a minimal solver that uses fewer features if only the direction of the rotation axis needs to be calculated.

Figure 4:
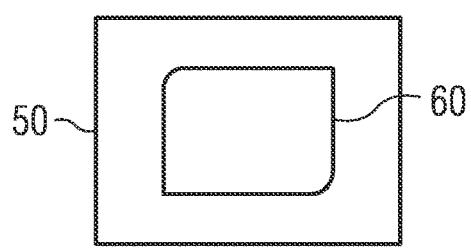
FIG. 4 illustrates a possible embodiment of a readable storage medium comprising executable program instructions.

FIG. 4 shows an embodiment of a computer readable storage medium 50 comprising executable program instructions 60 that perform the method according to the present invention when executed. Using the program instructions 60, the direction of the rotation axis relative to an image capture device by observing a position and/or orientation of the features on the images is calculated, and the extrinsic parameters of the image capture device 21, 22, 23 on the basis of the calculated direction of the rotation axis relative to the image capture device and the rotation relative to the vehicle are determined.

The computer readable storage medium 50 can be designed for example as a Random Access Memory (RAM), Read Only Memory (ROM), microSD/SDHC memory card, hard disc drive, and USB-Stick. The usage of different memory designs is not limited to the number of storage designs as listed, rather there are still other storage designs applicable.

Figure 5:
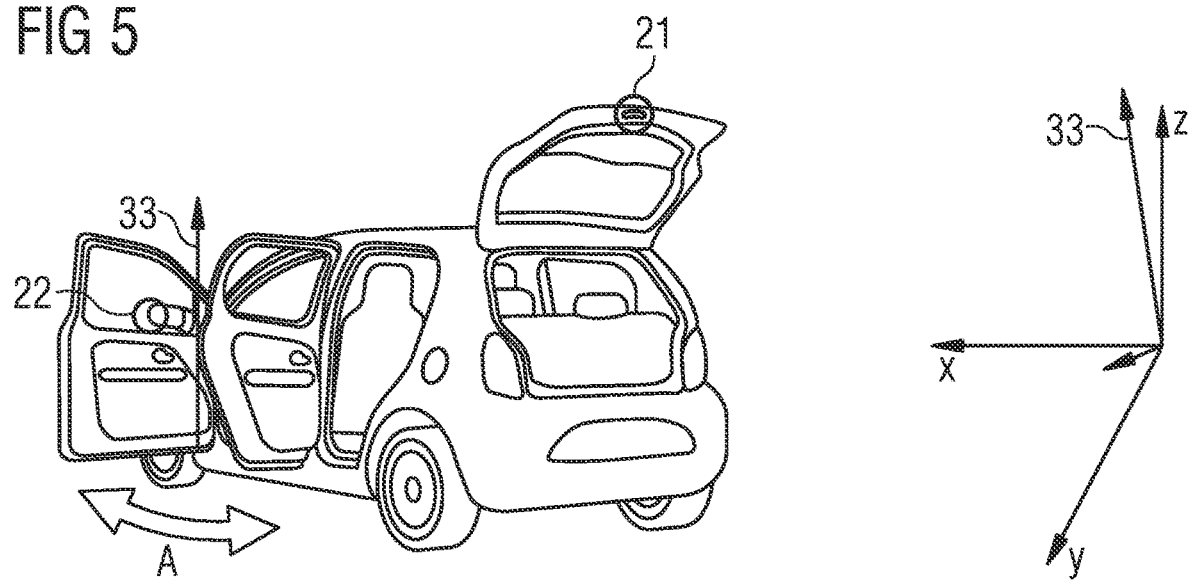
FIG. 5 shows a vehicle with mounted image capture system in a side/rear view and a diagram illustrating the calculated door rotation axis in an image captures device frame using the multiple image capture device approach.

FIG. 5 shows a vehicle 10 with mounted image capture systems 21, 22 in a side/rear view and a diagram illustrating the calculated door rotation axis 33 in an image capture system reference frame using the multiple image capture system 21, 22 approach.

In FIG. 5 the motion of the door is illustrated by the arrow A. While the door of the vehicle 10 is opened and closed, the door is moving around the door rotation axis 33. During the motion of the door around the door rotation axis 33, the image capture device 22 detects images of the body and/or body portion of the vehicle 10 and/or surrounding area of the vehicle 10 to identify different features and/or objects in the image. The image capture system can be mounted in the mirror. Further positions to mount the image capture system or to use for identifying features and/or objects are possible depending on the driver assistant systems. The motion of the identified features and/or objects will be computed using the plurality of different images detected by the image capture device of the image capture system 22. The motion can be used to calculate the direction of the door rotation axis 33 (door axis unit vector) with regard to the image capture device reference frame of the image capture device 22 as illustrated in the diagram.

Figure 6:
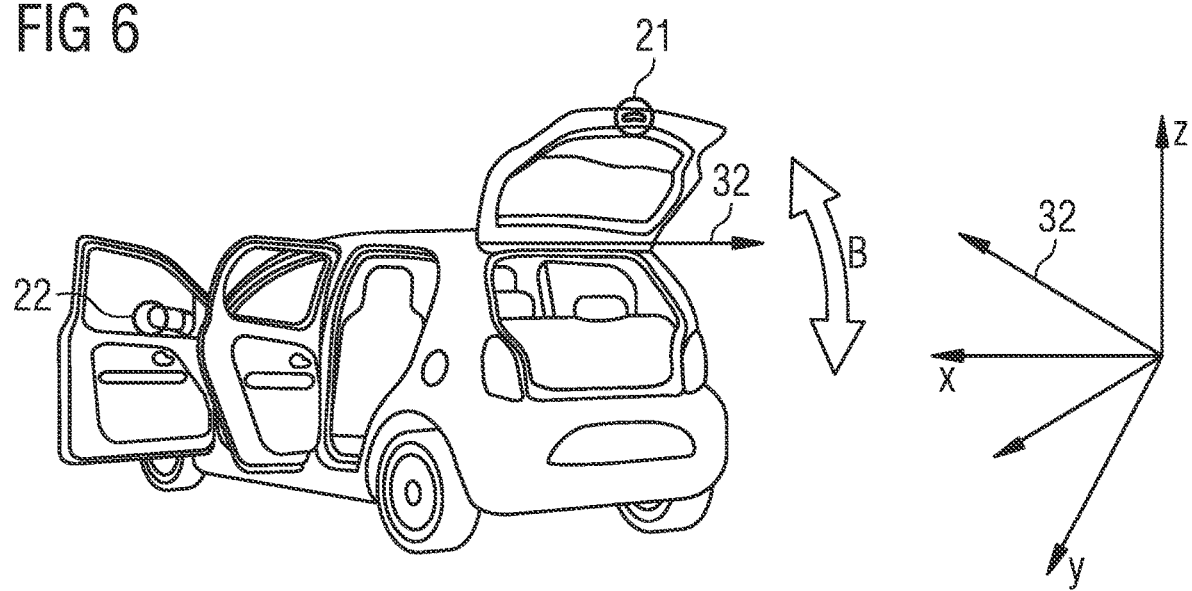
FIG. 6 shows a vehicle with mounted image capture systems in a side/rear view and a diagram illustrating the calculated boot rotation axis in an image captures device frame using the multiple image capture device approach.

FIG. 6 shows a vehicle 10 with mounted image capture devices 21, 22 in a side/rear view and a diagram illustrating the calculated boot rotation axis 32 in an image capture device reference frame using the multiple image capture system 21, 22 approach.

In FIG. 6 the motion of the boot is illustrated by the arrow B. While the boot of the vehicle 10 is opened and closed, the boot is moving around the boot rotation axis 32. During the motion of the boot around the boot rotation axis 32, the image capture device of the image capture system 21 captures images of the body and/or body portion of the vehicle 10 and/or surrounding area of the vehicle 10 to identify different features and/or objects in the images. Different positions to mount the image capture system or to use for identifying features and/or objects are possible depending on the driver assistant systems. The motion of the identified features and/or objects will be computed using the plurality of different images detected by the image capture device of the image capture system 21. The motion can be used to calculate a direction of the boot rotation axis 32 (boot axis unit vector) with regard to the image capture device reference frame of the image capture system 21 as illustrated in the diagram.

Figure 7:
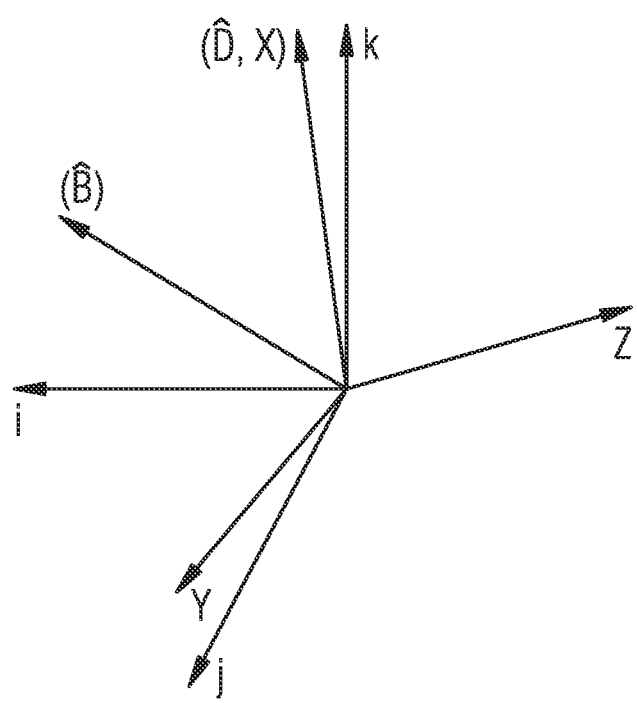
FIG. 7 shows a diagram illustrating the calculated rotation axis and the full rotation between an image captures system frame and vehicle frame using the multiple image capture device approach.

FIG. 7 shows a diagram illustrating the calculated rotation axis and the full rotation between an image capture system reference frame and a vehicle reference frame using the multiple image capture device approach.

In FIG. 7 the approach to calculate the extrinsic parameters of the image capture system by using the calculated rotation, both, around the door axis and the boot axis, is shown.

The axes X, Y, and Z in FIG. 7 represent the axes of the intermediate reference frame. The axes i, j, and k represent the bases of the image capture device reference frame 21. The axes $\hat{B}$ and $\hat{D}$ represent the boot axis unit vector and door axis unit vector.

To determine the extrinsic parameter, at first the door axis $\hat{D}$ from the image capture system reference frame 22 (camD) is rotated to the image capture system reference frame 21 (camB):

$$\hat{D}_{camB} = R_{camD/camB} \hat{D}_{camD}$$

This assumes the rotation $R_{camD/camB}$ from image capture system 22 to image capture system reference frame 21 is known. Once the door axis unit vector $\hat{D}$ and the boot axis unit vector $\hat{B}$ have been found in the image capture system reference frame 21 (camB), they can be used to calculate the Y axis of an intermediate reference frame.

$$\hat{Y} = \frac{\hat{D}_{camB} \times \hat{B}_{camB}}{|\hat{D}_{camB} \times \hat{B}_{camB}|}$$

The Z axis of the intermediate reference frame is then calculated using the door axis in the image capture system reference frame ($\hat{D}_{cam}$) and the unit vector $\hat{Y}$.

$$\hat{Z} = \hat{D}_{camB} \times \hat{Y}$$

With the X axis of the intermediate frame being:

$$\hat{X} = \hat{D}_{camB}$$

The rotation between the image capture system reference frame and the intermediate reference frame ($R_{cam/inter}$) is then calculated as $$R_{cam/inter} = \begin{bmatrix} \hat{X} \cdot i & \hat{X} \cdot j & \hat{X} \cdot k \\ \hat{Y} \cdot i & \hat{Y} \cdot j & \hat{Y} \cdot k \\ \hat{Z} \cdot i & \hat{Z} \cdot j & \hat{Z} \cdot k \end{bmatrix}$$

where i, j, and k are the bases of the image capture system B reference frame. Since the position and orientation of the door and boot axis are known in the vehicle reference frame, the rotation from the intermediate reference frame to the vehicle reference frame $R_{inter/vehicle}$ is known. This can then be used to calculate the rotation between image capture system reference frame 21 and vehicle reference frame $R_{cam/vehicle}$.

$$R_{camB/vehicle} = R_{inter/vehicle} R_{camB/inter}$$

The extrinsic parameters of the other capture device can then be found using the known rotation between the image capture devices.

The above illustrated approach provides an embodiment to calculate the extrinsic parameters with two image capture devices using two rotation axes such as the door axis and the boot axis.

In a further embodiment the door axis and the bonnet axis can be used to calculate the extrinsic parameters.

This approach according to the present invention has the advantage that the image capture systems 21, 22, 23 of a vehicle 10 can be quickly and simply calibrated by opening and closing the door and boot/bonnet. Further the approach provides a high accuracy orientation calculation. The features and/or objects detected by the image capture device of the image capture system 21, 22, 23 will appear to move over a large arc because of the long motion of the door and boot/bonnet. With a small amount of motion there would be more errors within the calculation.

Advantageously, the method according to the present invention does not require a vehicle motion. The method can be performed in the factory or garage in the parking position. Furthermore, the vehicle does not need a precise and measured position with regard to placed reference points (features such as straight lines on ground plane, calibration boards attached to the car, or any measured vehicle portions or vehicle features e.g. tire, hubcap).

Figure 8:
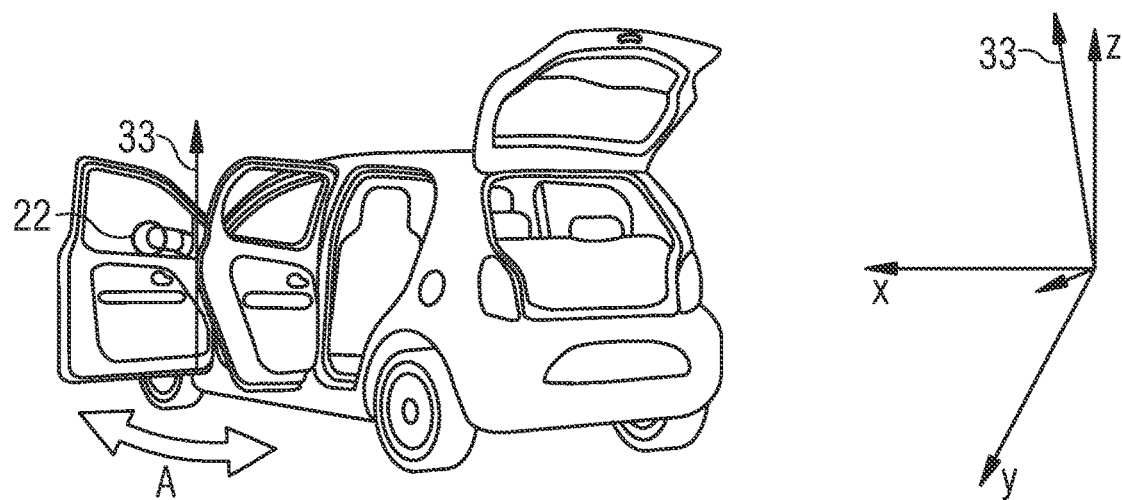
FIG. 8 shows a vehicle with a mounted image capture system in a side/rear view and a diagram illustrating the calculated door rotation axis in an image captures system frame using the single image capture device approach.

FIG. 8 shows a vehicle 10 with a mounted image capture device 22 in a side/rear view and a diagram illustrating the calculated door rotation axis 33 in an image capture device reference frame using the single image capture device of the image capture system 22 approach.

In FIG. 8 the motion of the door is illustrated by the arrow A. While the door of the vehicle 10 is opened and closed, the door is moving around the door rotation axis 33. During the motion of the door around the door rotation axis 33, the image capture device of the image capture system 22 captures images of the body and/or body portion of the vehicle 10 and/or surrounding area of the vehicle 10 to identify different image features and/or objects. The image capture system can be mounted in the mirror. Further positions to mount the image capture systems or to use for identifying features and/or objects are possible depending on the driver assistant systems. The motion of the identified features and/or objects will be computed from the plurality of different images captured by the image capture device of the image capture system 22. The motion can be used to calculate the direction of the door rotation axis 33 (door axis unit vector) with regard to the image capture device reference frame of the image capture device 22 as illustrated in the diagram.

Figure 9:
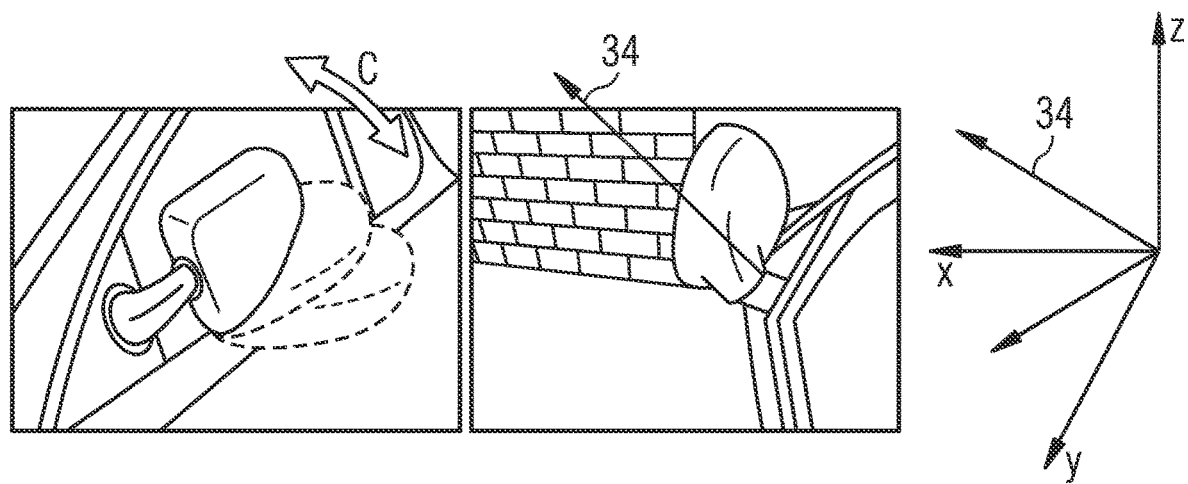
FIG. 9 shows a mirror of a vehicle with a mounted image capture system in a side view and a diagram illustrating the calculated mirror rotation axis in an image captures system frame using the single image capture device approach.

FIG. 9 shows a mirror of a vehicle with a mounted image capture device 22 (not shown) in a side view and a diagram illustrating the calculated mirror rotation 34 axis in an image capture device reference frame using the single image capture 22 device approach.

In FIG. 9 the motion of the wing mirror is illustrated by the arrow C. While the mirror of the vehicle 10 is folded and unfolded, the mirror is moving around the mirror rotation axis 34. During the motion of the mirror around the mirror rotation axis 34, the image capture device of the image capture system 22 captures images of the body and/or body portion of the vehicle and/or surrounding area of the vehicle 10 to identify different image features and/or objects in the images. The motion of the identified image features and/or objects will be computed from the plurality of different images detected by the image capture device of the image capture system 22. The motion can be used to calculate the direction of the mirror rotation axis 34 (mirror axis unit vector) with regard to the image capture device reference frame of the image capture device 22 as illustrated in the diagram.

Figure 10:
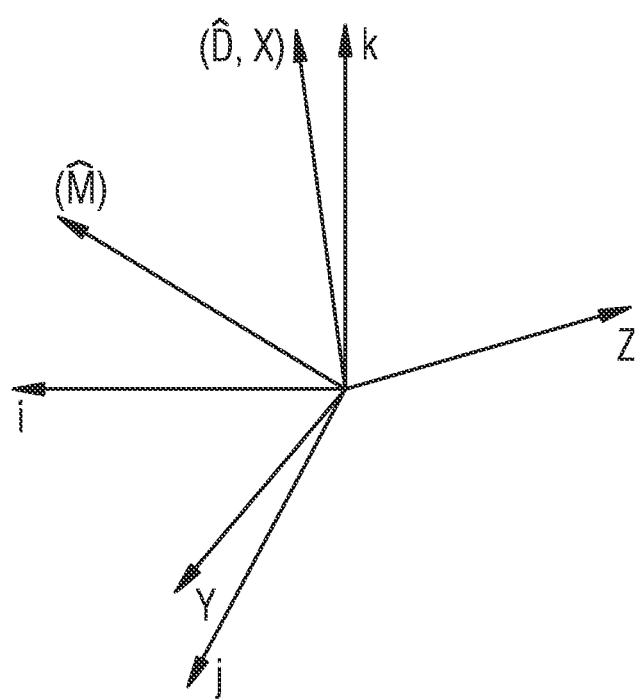
FIG. 10 shows a diagram illustrating the calculated rotation axis and the full rotation between an image captures system frame and vehicle frame using the single image capture device approach.

FIG. 10 shows a diagram illustrating the calculated rotation axis and the full rotation between an image capture device reference frame and vehicle reference frame using the single image capture device approach.

In FIG. 10 the approach to calculate the extrinsic parameters of the image capture device by using the calculated rotation, both, around the door axis and the mirror axis of a single image capture device, is shown.

The axes X, Y, and Z in FIG. 10 represent the axes of the intermediate reference frame. The axes i, j, and k represent the bases of the image capture system reference frame 22. The axes $\hat{M}$ and $\hat{D}$ represent a mirror axis unit vector and a door axis unit vector.

If the door axis unit vector $\hat{D}$ and the mirror axis unit vector $\hat{M}$ have been calculated in the image capture system reference frame (cam), they can be used to calculate the Y axis of an intermediate reference frame.

$$\hat{Y} = \frac{\hat{D}_{cam} \times \hat{M}_{cam}}{|\hat{D}_{cam} \times \hat{M}_{cam}|}$$

The Z axis of the intermediate reference frame is then calculated using the door axis in the image capture system 22 ($\hat{D}_{cam}$) and the unit vector $\hat{Y}$.

$$\hat{Z} = \hat{D}_{cam} \times \hat{Y}$$

With the X axis of the intermediate reference frame being:

$$\hat{Z} = \hat{D}_{cam}$$

The rotation between the image capture system reference frame and the intermediate reference frame $R_{cam/inter}$ is then calculated as:

$$R_{cam/inter} = \begin{bmatrix} \hat{X} \cdot i & \hat{X} \cdot j & \hat{X} \cdot k \\ \hat{Y} \cdot i & \hat{Y} \cdot j & \hat{Y} \cdot k \\ \hat{Z} \cdot i & \hat{Z} \cdot j & \hat{Z} \cdot k \end{bmatrix}$$

Where i, j, and k are the bases of the image capture system reference frame. Since the position and orientation of the door and mirror axis are known in the vehicle reference frame, the rotation from the intermediate reference frame to the vehicle reference frame $R_{inter/vehicle}$ is known. This can then be used to calculate the rotation between image capture system reference frame and vehicle reference frame $R_{cam/vehicle}$.

$$R_{cam/vehicle} = R_{inter/vehicle} R_{cam/inter}$$

In a further embodiment, to calculate the extrinsic parameters the motion caused by opening and closing the bonnet or boot and the motion of the image capture device around a mechanism (fixed point of the image capture device) in the boot and/or bonnet can be used. In this point the image capture system rotates and provides an extra rotation to the image capture system on the boot and bonnet that can be used to calculate the extrinsic parameters with the single image capture device approach.

REFERENCE NUMBERS 10 vehicle
11 side view of a vehicle
12 front view of a vehicle
13 top view of a vehicle
14 rear view of a vehicle
21 image capture device (frame) boot of a vehicle
22 image capture device (frame) mirror (l, r) of a vehicle
23 image capture device (frame) bonnet of a vehicle
31 rotation axis of the bonnet
32 rotation axis of the boot
33 rotation axis of the doors (l, r)
40 control unit
41 memory unit
42 identification unit
43 calculation unit
44 calibration unit
S1 step of detecting
S2 step of identifying
S3 step of calculating
S4 step of determining

The invention claimed is:

1. A system for extrinsic calibration of an image capture apparatus of a vehicle, wherein the vehicle includes a vehicle body and a movable part, wherein the movable part is configured to rotate around a rotation axis having a known position and orientation relative to the vehicle body, and wherein the system comprises:
   an image capture apparatus comprising an image capture device that is mounted on the vehicle body, and is configured to capture at least first and second images of the movable part; and
   at least one processor that is configured
      to identify image features of the movable part in the images, to calculate a calculated direction of the rotation axis relative to the image capture device based on the image features, and to determine extrinsic parameters of the image capture apparatus based on the calculated direction of the rotation axis relative to the image capture device and the known position and orientation of the rotation axis relative to the vehicle body.

2. The system according to claim 1, wherein the first image depicts the movable part in a first rotation position relative to the vehicle body, and the second image depicts the movable part in a second rotation position different from the first rotation position relative to the vehicle body.

3. The system according to claim 1, wherein the image features comprise at least two image features of the movable part in the first image and at least two corresponding image features of the movable part in the second image.

4. The system according to claim 1, wherein the movable part comprises a part selected from the group consisting of a boot, a bonnet, a mirror and a door of the vehicle.

5. The system according to claim 1, further comprising a memory configured to store at least one vehicle characteristic.

6. The system according to claim 5, wherein the vehicle characteristic comprises a position of the image capture device mounted on the vehicle body.

7. A vehicle comprising:
a vehicle body;
a movable part configured to rotate around a rotation axis having a known position and orientation relative to the vehicle body; and
the system according to claim 1;
wherein the image capture device is mounted on the vehicle body and is configured to capture the images of the movable part.

8. The vehicle according to claim 7, wherein the movable part comprises a part selected from the group consisting of a bonnet, a boot, a mirror and door of the vehicle.

9. A method for extrinsic calibration of an image capture apparatus of a vehicle, wherein the vehicle includes a vehicle body and a movable part, wherein the movable part is configured to rotate around a rotation axis having a known position and orientation relative to the vehicle body, wherein the image capture apparatus includes an image capture device mounted on the vehicle body, and wherein the method comprises:

with the image capture device, capturing at least first and second images of the movable part;

identifying image features of the movable part in the images;

calculating a calculated direction of the rotation axis relative to the image capture device based on the image features; and determining extrinsic parameters of the image capture apparatus based on the calculated direction of the rotation axis relative to the image capture device and the known position and orientation of the rotation axis relative to the vehicle.

10. The method according to claim 9, wherein the first image depicts the movable part in a first rotation position relative to the vehicle body and the second image depicts the movable part in a second rotation position different from the first rotation position relative to the vehicle body.

11. The method according to claim 9, wherein the image features comprise at least two image features of the movable part in the first image and at least two corresponding image features of the movable part in the second image.

12. The method according to claim 9, performed when the vehicle is parked.

13. The method according to claim 9,
further comprising capturing additional images of a second movable part that is configured to rotate around a second axis relative to the vehicle body, identifying additional image features of the second movable part in the additional images, and calculating a second direction of the second axis based on the additional image features, wherein the second axis is not parallel to the rotation axis, and wherein the determining of the extrinsic parameters is further based on the second direction of the second axis.

14. A non-transitory computer-readable storage medium storing thereon executable program instructions that perform the method according to claim 9 when executed.

* * * * *